(12) United States Patent
Heller

(10) Patent No.: US 6,525,651 B1
(45) Date of Patent: Feb. 25, 2003

(54) FORCE-RESPONSIVE DETECTORS AND SYSTEMS

(75) Inventor: Norbert Heller, Grefrath (DE)

(73) Assignee: Gencorp Property Inc., Rancho Cordova, CA (US)

( * ) Notice: Subject to any disclaimer, the term of this patent is extended or adjusted under 35 U.S.C. 154(b) by 0 days.

(21) Appl. No.: 09/744,073

(22) PCT Filed: Jul. 13, 1999

(86) PCT No.: PCT/GB99/02245

§ 371 (c)(1),
(2), (4) Date: Feb. 21, 2001

(87) PCT Pub. No.: WO00/04562

PCT Pub. Date: Jan. 27, 2000

(30) Foreign Application Priority Data

Jul. 18, 1998 (GB) .............................................. 9815626

(51) Int. Cl.[7] ................................................ B60Q 1/00
(52) U.S. Cl. ........................ 340/425.5; 340/665; 49/27; 318/488; 200/61.58 R
(58) Field of Search ............................. 340/425.5, 438, 340/500, 540, 665; 318/466, 488; 49/27, 28; 200/61.58 R, 268, 272

(56) References Cited

U.S. PATENT DOCUMENTS 3,270,160 A 8/1966 Koenig
4,115,952 A 9/1978 French
5,592,060 A * 1/1997 Racine et al. ................ 318/469

FOREIGN PATENT DOCUMENTS

| DE | 2 257 597 | 5/1973 |
| EP | 0 606 589 A1 | 7/1994 |
| GB | 2 314 378 A | 12/1997 |

* cited by examiner

Primary Examiner—Julie Lieu
(74) Attorney, Agent, or Firm—Leydig, Voit & Mayer, Ltd.

(57) ABSTRACT

A force-responsive sensor is disclosed, such as for incorporation in a safety system for detecting an obstruction in a window opening closable by a motorized slidable window pane. The sensor is mounted within a hollow volume in flexible material running alongside the top frame member of the window opening. The sensor comprises an upper flexible and resilient layer supporting a continuous longitudinally extending conductive strip. This upper layer is spaced from a similar layer supporting a continuous longitudinally extending conductive strip, the two layers being separated from each other by insulating spacers spaced at intervals along the length of the sensor. Any obstruction in the window opening is carried upwardly by the rising window glass and applies a force to the flexible material. A ridge in the lower wall of the hollow chamber responds by causing contact between the two conductive strips to produce a warning signal. The construction is such that the sensor responds not only to a point force but also to a force applied over a substantial length of the window frame.

9 Claims, 4 Drawing Sheets

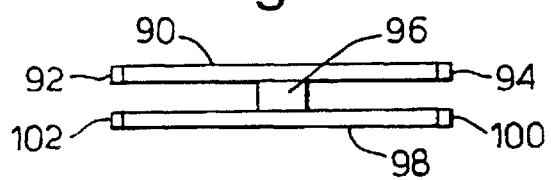
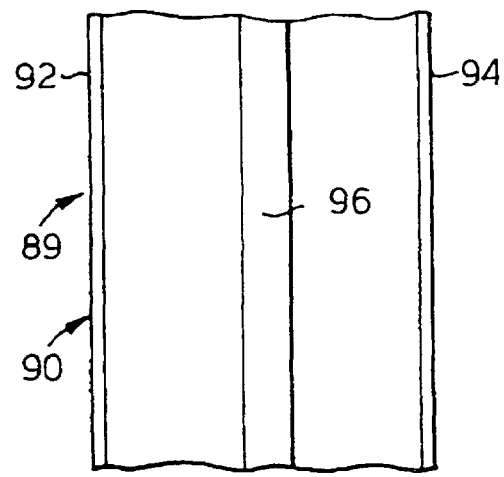
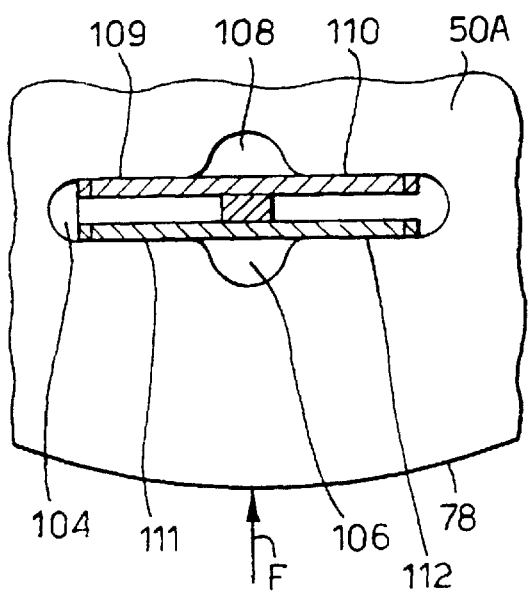
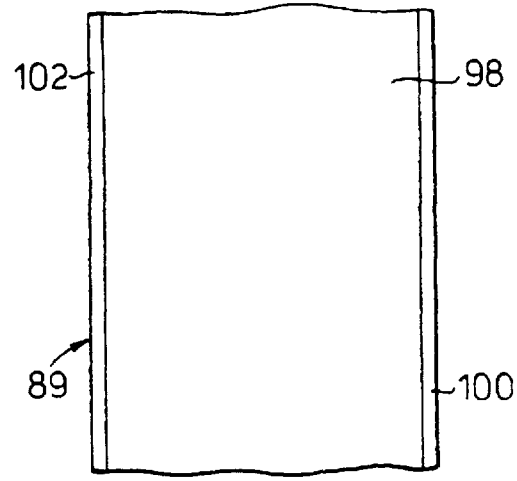

FORCE-RESPONSIVE DETECTORS AND SYSTEMS

BACKGROUND OF THE INVENTION

The invention relates to a force-responsive longitudinally extending sensor arrangement, comprising first longitudinally extending electrically conductive strip means defining a first longitudinally extending continuous electrically conductive region, second longitudinally extending electrically conductive strip means defining a second longitudinally extending continuous electrically conductive region, the strip means being mounted so that the two regions are superimposed and are normally resiliently separated from each other by electrically insulating spacer means which are situated between the two strip means, the two regions being able to be flexed against the resilience relatively towards each other in response to a predetermined force so that contact occurs between at least a portion of one of the regions and a corresponding portion of the other region.

SUMMARY OF THE INVENTION

The invention is concerned, however, with the requirement that not only should the arrangement be able to detect a force applied over a small area but also a force applied over a relatively large area.

According to the invention, therefore, the sensor arrangement as first set forth above is characterised by force-applying means arranged to apply the predetermined force at positions clear of the spacer means.

BRIEF DESCRIPTION OF THE DRAWINGS

Force-responsive sensors and systems embodying the invention, for use in window safety systems in motor vehicles, will now be described, by way of example only, with reference to the accompanying diagrammatic drawings in which:

FIG. 9 is an end view of a further modified form of the sensor;

FIG. 10 is an underneath view of part of the sensor of FIG. 9;

FIG. 11 is a plan view of another part of the sensor of FIG. 9; and

FIG. 12 corresponds to FIG. 6 but shows the sensor of FIGS. 9–11 mounted in the window channel.

DESCRIPTION OF THE PREFERRED EMBODIMENTS

Figure 1:
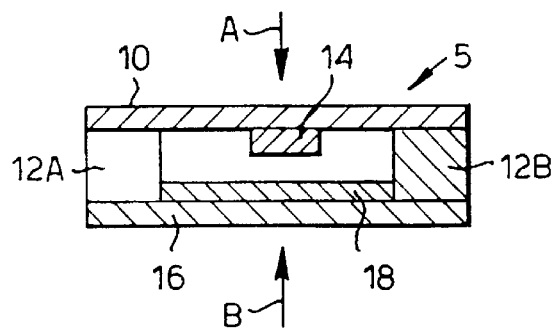
FIG. 1 is a cross-section through one of the sensors.
Figure 2:
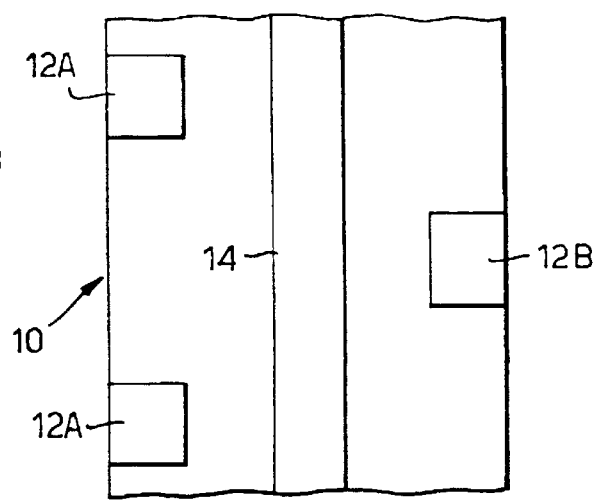
FIG. 2 is an underneath view of a first part of the sensor of FIG. 1.
Figure 3:
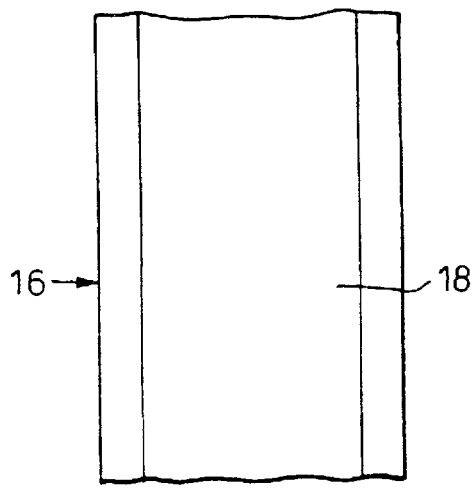
FIG. 3 is a plan view of a second part of the sensor of FIG. 1.

FIGS. 1, 2 and 3 show one of the sensors 5. It is of indeterminate length and predetermined width. In response to a force applied to it at individual points along either of its large surfaces and in a direction perpendicular, or at least transverse, to such surface, it produces an electrically detectable signal in a manner to be described.

As shown in FIG. 1, the sensor has an upper rectangular cover layer 10 which is made of flexible and resilient electrically insulating material and extends over the entire upper surface (as viewed in FIG. 1) of the sensor. The cover layer 10 carries spacers 12A and 12B made of electrically insulating material which are positioned at intervals along the length of the cover layer, as will be described in more detail below with reference to FIG. 2. In addition, the underside of the cover layer 10 carries an electrically conductive strip 14 extending along the full length of the sensor.

The sensor 5 also has a lower or base layer 16 which is again made of electrically insulating and flexible and resilient material. It extends over the entire lower surface (as viewed in FIG. 1) of the sensor. The layer 16 carries a longitudinally extending strip 18 of electrically conductive material on its upper surface which, like the conductive layer 14, extends along the full length of the sensor.

FIG. 2 is an underside view of the cover layer 10, removed from the sensor. FIG. 2 shows how the spacers 12A, 12B are positioned at intervals along the length of the sensor and staggered in relation to each other across the width of the cover layer 10.

FIG. 3 is a plan view of the base layer 16 when removed from the sensor.

When a force is applied to the cover layer 10 in the direction of the arrow A (FIG. 1), the layer 10 flexes and the conductive strip 14 will be pressed into contact with the conductive strip 18. This assumes, of course, that the base layer 16 is suitably supported. Similarly, if a force is applied in the direction of the arrow B, the layer 16 flexes and again contact between the conductive strips 14 and 18 will take place (assuming that the cover layer 10 is properly supported). If the conductive strips 14 and 18 are connected to a suitable electrical supply, an electrical signal will thus be produced when contact between the conductive strips 14 and 18 occurs.

In this way, an electrical signal can be produced by the sensor 5 in response to a force applied at substantially any point along its length.

The spacers 12A, 12B, in combination with the resilience of the cover layer 10, ensure that there is no normal contact between the strips 14 and 18.

The spacers 12A, 12B and the conductive strips 14, 18, are advantageously formed on the layers 10 and 16 by means of a printed circuit technique.

The spacers 12 are shown in FIGS. 1 and 2 as being of rectangular form in plan and cross-section. However, they can be of any suitable shape.

Figure 4:
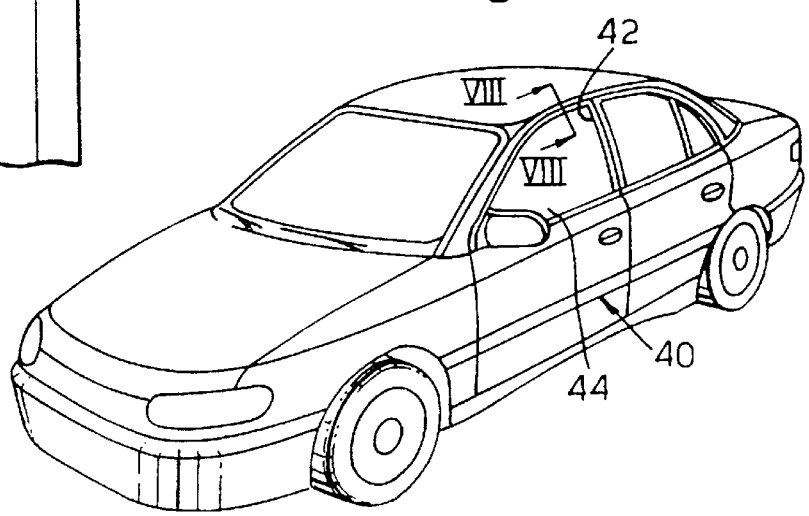
FIG. 4 is a perspective view of a motor vehicle showing where one of the sensors can be mounted in a window channel.
Figure 5:
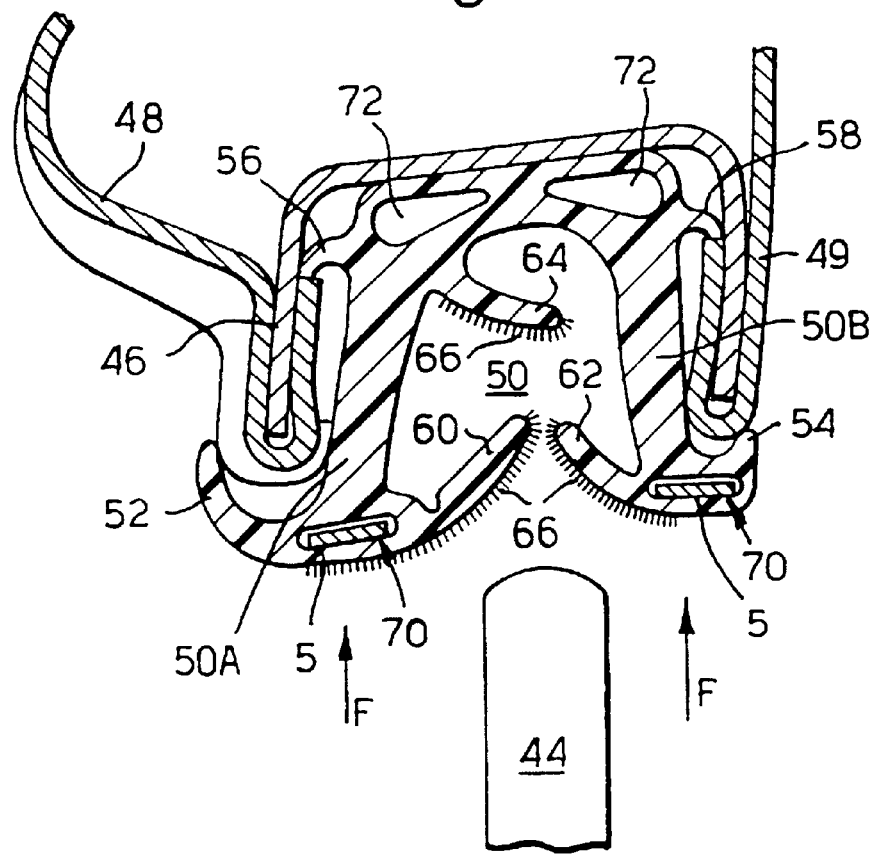
FIG. 5 is a section on the line V—V of FIG. 4.

As shown in FIG. 4, a motor vehicle has a door 40 supporting a window frame 42 in which a window glass 44 is upwardly and downwardly slidable. The window glass 44 is raised and lowered by means of an electric motor operable under control of an occupant of the vehicle. FIG. 5 shows a section through the window frame 42, comprising a rigid mounting channel 46 supported by inner and outer frame members 48 and 49. The mounting channel 46 supports a window sealing and guiding channel 50 having side walls having side walls 50A and 50B. The window channel 50 may be made of extruded or moulded flexible material such as rubber or plastics material. The distal edges of the side walls of the channel have outwardly directed lips 52 and 54 which extend over the corresponding edges of the mounting channel 46. Near the base of the channel 50, it has further outwardly directed lips 56 and 58 which engage the curved-over edge regions of the frame members 48 and 43 and resiliently hold the channel 50 within the mounting channel 46.

The channel 50 also has lips 60 and 62 which extend across the mouth of the channel and a further inner lip 64 near the base of the channel. FIG. 5 shows the window glass 44 which, as it rises to the closed position, enters the channel 50 with the outer surfaces of the lips 60 and 62 bearing against its opposite faces and the lip 64 bearing against the edge of the glass. The surfaces of the lips 60,62,64 which make contact with the glass 44 may be covered with a layer of flock 66 or other similar material.

Within the distal edge of each side wall of the channel 50, one of the sensors 5 (as shown in FIGS. 1 to 3) is embedded as a unit so as to run longitudinally along the length of at least part of the channel 50; advantageously, each sensor 5 runs along that part of the channel 50 which extends along the top of the window opening and down the "A" pillar of the vehicle to the region of the rear view mirror. FIG. 5 shows the sensors 5 merely diagrammatically.

Figure 6:
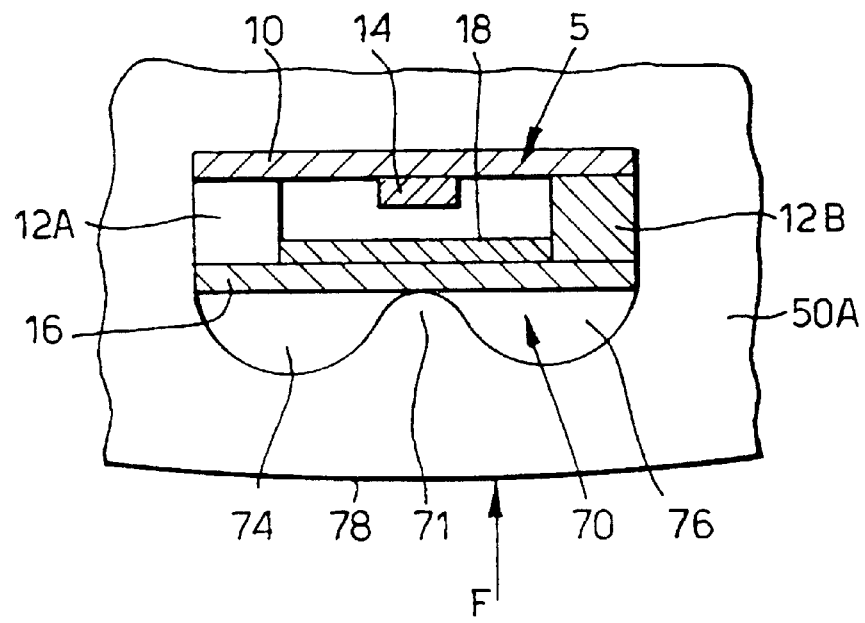
FIG. 6 is an enlarged view of part of FIG. 5 showing the sensor of FIGS. 1 to 3 mounted in the window channel.

FIG. 6 shows an enlarged view of the region "X" of FIG. 5, and shows how the sensor 5 is mounted within a hollow chamber 70 in the material of the side wall 50A of the channel 50. The chamber 70 has a generally planar upper internal wall which abuts against the outer surface of the cover layer 10 of the sensor 5. Along its lower surface, however, the hollow chamber 70 has a longitudinally extending ridge 71 which is in contact with the undersurface of the base layer 16, and which thus produces longitudinally extending hollow grooves 74, 76.

If an obstruction, such as part of the human body, is placed in the window opening when the window glass 44 (FIG. 5) is in the open or partly open position, and the window is then caused to rise by energisation of the driving motor, the obstruction will be carried upwardly by the closing window glass and will cause a force F to be applied to the outwardly facing surface 78 of the material of the side wall 50A of the channel 50. This force will be transmitted by the material of the channel to the ridge 71, causing the base layer 16 to flex so that the conductive strip 18 moves into electrical contact with the conductive strip 14. An electrically detectable control signal will therefore be produced which can be used to cause immediate de-energisation of the window glass driving motor, advantageously followed by reversal of the motor to lower the window glass away from the obstruction.

The construction of the sensor 5 in the opposite side wall 50B of the channel 50 is the same.

As shown in FIG. 5, the base of the channel 50 is provided with two longitudinally extending chambers 72 to increase the resilience of the side walls of the channel. This additional resilience ensures that only a low reactive force is applied to the obstruction by the window glass during the very short period of time in which it may continue to rise after the sensor 5 has produced the control signal. Clearly, the resilience of the side wall must not be so great as to reduce the sensitivity of the sensor The hollow chambers 72 may be omitted.

The arrangement shown in FIG. 6 is advantageous in that it will not only detect a force F applied to a small part of the total area of the surface 78 (e.g. insertion of a human finger into the window opening) but it will also detect a force applied over an extended area of the surface 78 (e.g. by a human arm or head). This is because the sensor S has no electrically insulating spacers extending across its full width (for example, at intervals along the length of the sensor), so that there is nothing to prevent such a large-area force from causing the ridge 71 to move the conductive strip 18 into contact with the conductive strip 14.

Figure 7:
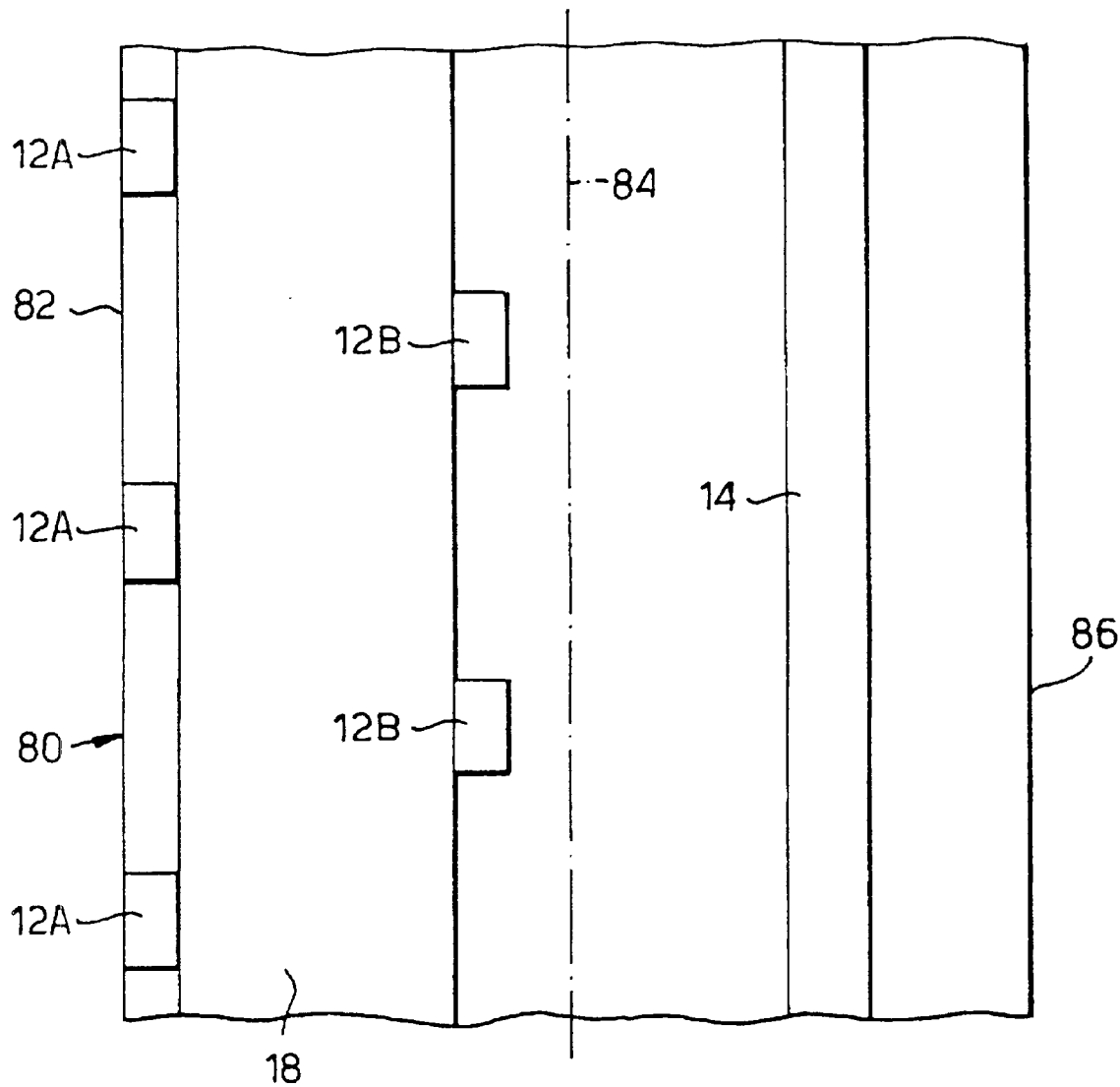
FIG. 7 is a plan view showing a stage in the construction of a modified form of the sensor of the preceding Figures.
Figure 8:
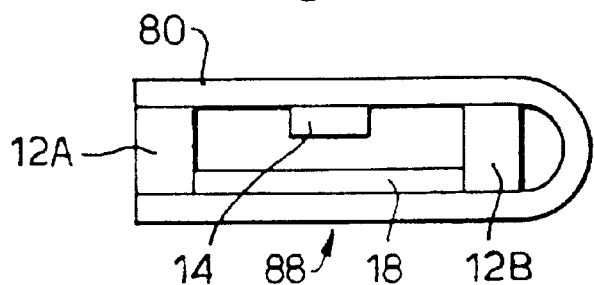
FIG. 8 corresponds to FIG. 7 but is an end view showing a later stage in the manufacture of the sensor of FIG. 7.

FIGS. 7 and 8 show how a sensor of the general form shown in FIGS. 1 to 3 may conveniently be produced. In the sensor of FIGS. 7 and 8, the separate electrically insulating layers 10 and 16 are replaced by a single resilient and flexible electrically insulating layer 80. By means of a printed circuit technique preferably (or other suitable technique), electrically insulating spacers 12A, 12B are formed on the upper surface of the layer 80 along two lines, one line being immediately adjacent an edge 82 to the layer 80 and the other line being between the edge 82 and the centre line 84 of the layer 80. Again, the spacers 12A, 12B are staggered in relation to each other along the length of the sensor.

An electrically conductive strip 18, corresponding to the strip 18 of the sensor 5 of FIGS. 1 to 3, is formed onto the upper surface of the layer 80, between the spacers 12A and 12B. A narrower electrically conductive strip 14, corresponding to the strip 14 of the sensor 5 of FIGS. 1 to 3, is formed on the upper surface of the layer 80, mid-way between the centre line 84 of the layer 80 and the edge 86.

A bending operation is then carried out, bending one half of the layer 80 onto the other half, along a bend line coinciding with the centre line 94. The result of this is to produce the sensor 88 shown in FIG. 8. Such a sensor may be used in the same way as described above with reference to FIGS. 1 to 3 and 4 to 6.

FIGS. 9–11 show another modified sensor.

In the sensor 89 of FIGS. 9–11, there is an upper layer 90 which is made of resilient and flexible electrically conductive material having narrow longitudinally extending electrically insulating edge regions 92 and 94 and carrying an electrically insulating spacer 96.

In addition, the sensor has a lower or base layer 98, again made of flexible and resilient electrically conductive material and with narrow longitudinally extending electrically insulating edge regions 100 and 102. FIG. 10 shows an underside plan view of the layer 90, and FIG. 11 shows a plan view of the layer 98.

FIG. 12 corresponds to FIG. 6 and shows how the sensor 89 of FIGS. 9 to 11 can be incorporated as a unit within a hollow chamber in the material of the wall of the channel 50 (FIG. 5) of the window glass of a motor vehicle door.

As shown in FIG. 12, the hollow chamber 104 of FIG. 11 differs from the hollow chamber 70 of FIG. 6 in that the hollow chamber 104 has longitudinally extending grooves or recesses 106, 108 instead of the longitudinally extending ridge 71 of FIG. 6. The internal surface of the chamber 70 is thus in contact with the sensor 89 over longitudinally extending regions 109, 110, 111 and 112. Within the chamber 104, the resilience of the layers 90, 98, together with the electrically insulating spacer 96, ensure that the conductive areas of the layers 90 and 98 are normally held spaced apart. However, in response to a force F applied to the surface 78 of the flexible material, by an obstruction present in the window opening while the window glass is rising (in the manner explained in conjunction with FIG. 6), the material of the window channel in the regions 111 and 112, on each side of the groove 108, causes the conductive area of the lower layer 98 of the sensor to move into contact with part of the conductive area of the upper layer 90, thereby producing an electrical signal. Again, the sensor will respond not only to a force F applied to a small part of the area of the surface 78 but also to a force applied over a large part of this area.

The narrow insulating regions 92, 94, 100, 102 ensure that inadvertent contact does not occur between the two layers 90, 98.

What is claimed is:

1. A force-responsive longitudinally extending sensor arrangement, comprising:
    first longitudinally extending electrically conductive strip means defining a first longitudinally extending continuous electrically conductive region,
    second longitudinally extending electrically conductive strip means defining a second longitudinally extending continuous electrically conductive region,
    first and second support layers made of flexible and resilient electrically insulating material,
    electrically insulating spacer means comprising a plurality of discrete insulating means spaced longitudinally apart from each other along the strip means, and positioned alongside the regions and on opposite sides thereof, each discrete insulating means on one side of the regions being opposite a space between two discrete insulating means on the other side of the regions, and
    a force applying means for applying a predetermined force,
    the first and second strip means being mounted on the first and second support layers, respectively, so that the two regions are superimposed and are normally resiliently separated from each other by said electrically insulating spacer means which are situated between the two strip means, the two regions being able to be flexed against the resilience relatively towards each other in response to said predetermined force so that contact occurs between at least a portion of one of the regions and a corresponding portion of the other region, and said force-applying means being arranged to apply the predetermined force at positions clear of the spacer means for allowing flexing of one of the support layers so that the conductive strip means mounted thereon is able to move into electrical contact with the other conductive strip means.

2. A sensor arrangement according to claim 1, wherein the force-applying means comprises flexible material defining a longitudinally extending hollow volume within flexible material for detecting a said predetermined force applied externally of the hollow volume to the flexible material, the two strip means and the spacer means being mounted within the hollow volume so that the force partially compresses the hollow volume and applies the said predetermined force.

3. A sensor arrangement according to claim 2 wherein the flexible material is mounted alongside the frame of an opening closable by a motor-driven slidable closure member whereby an obstruction within the opening is carried towards the frame by the sliding closure member to produce the external force on the flexible material, and by means responsive to the contact between the conductive regions caused by that force to produce an obstruction-indicating signal.

4. A sensor arrangement according to claim 3, further comprising control means responsive to the obstruction-indicating signal to arrest motor-driven movement of the closure member.

5. A sensor arrangement according to claim 1, wherein the two strip means, the spacer means, and the support layers together form a unit.

6. A sensor arrangement according to claim 2, wherein the two strip means, the spacer means, and the support layers are placed in the hollow volume as a removable unit.

7. A safety system for detecting an obstruction in a frame defining an opening closable by a motor-driven slidable closure member, said system comprising:
    a force-responsive longitudinally extending sensor arrangement, comprising first longitudinally extending electrically conductive strip means defining a first longitudinally extending continuous electrically conductive region, second longitudinally extending electrically conductive strip means defining a second longitudinally extending continuous electrically conductive region, first and second support layers made of flexible and resilient electrically insulating material, electrically insulating spacer means, and a force applying means for applying a predetermined force, the first and second strip means being mounted on the first and second support layers, respectively, so that the two regions are superimposed and are normally resiliently separated from each other by said electrically insulating spacer means which are situated between the two strip means, the two regions being able to be flexed against the resilience relatively towards each other in response to said predetermined force so that contact occurs between at least a portion of one of the regions and a corresponding portion of the other region, said force-applying means being arranged to apply the predetermined force at positions clear of the spacer means for allowing flexing of one of the support layers so that the conductive strip means mounted thereon is able to move into electrical contact with the other conductive strip means, and said spacer means comprising a plurality of discrete insulating means spaced longitudinally apart from each other along the strip means, and positioned alongside the regions and on opposite sides thereof, each discrete insulating means on one side of the regions being opposite a space between two discrete insulating means on the other side of the regions;
    said sensor arrangement being mounted on or adjacent the frame of the opening and so positioned that said predetermined force is applied thereto when said obstruction within the opening is carried towards the frame by the slidable closure member; and
    control means responsive to said contact between the electrically conductive regions to arrest motor-driven movement of the closure member.

8. A system according to claim 7, further comprising a flexible guiding and sealing channel including side walls having parallel longitudinally extending distal edges, and being mounted on the frame for receiving an edge of the closure member which enters the mouth of the channel defined between said parallel longitudinally extending distal edges of the side walls of the channel, the sensor arrangement being mounted on the channel to run longitudinally along or immediately adjacent to one of the distal edges.

9. A system according to claim 8, comprising:
    a further force-responsive longitudinally extending sensor arrangement, comprising first longitudinally extending electrically conductive strip means defining a first longitudinally extending continuous electrically conductive region, second longitudinally extending electrically conductive strip means defining a second longitudinally extending continuous electrically conductive region, first and second support layers made of flexible and resilient electrically insulating material, electrically insulating spacer means, and a force applying means for applying a predetermined force, the first and second strip means being mounted on the first and second support layers, respectively, so that the two regions are superimposed and are normally resiliently separated from each other by said electrically insulating spacer means which are situated between the two strip means, the two regions being able to be flexed against the resilience relatively towards each other in response to said predetermined force so that contact occurs between at least a portion of one of the regions and a corresponding portion of the other region, said force-applying means being arranged to apply the predetermined force at positions clear of the spacer means for allowing flexing of one of the support layers so that the conductive strip means mounted thereon is able to move into electrical contact with the other conductive strip means, and said spacer means comprising a plurality of discrete insulating means spaced longitudinally apart from each other along the strip means, and positioned alongside the regions and on opposite sides thereof, each discrete insulating means on one side of the regions being opposite a space between two discrete insulating means on the other side of the regions;

wherein the further sensor arrangement is mounted on the channel to run longitudinally along or immediately adjacent to the other distal edge.

* * * * *